UNITED STATES PATENT OFFICE.

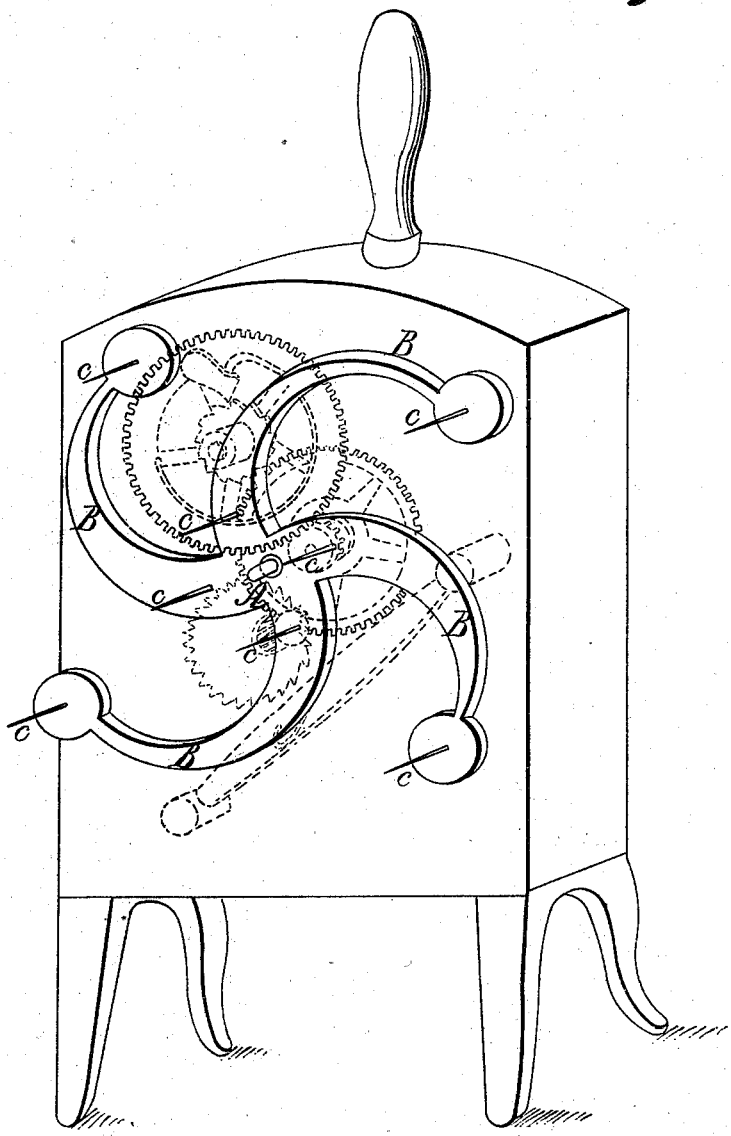

H. W. HARKNESS AND W. A. TERRY, OF BRISTOL, CONNECTICUT, ASSIGNORS TO THEMSELVES AND JOS. SIGOURNY, OF SAME PLACE.

APPARATUS FOR BROILING, TOASTING, &c.

Specification of Letters Patent No. 21,297, dated August 24, 1858.

*To all whom it may concern:*

Be it known that we, H. W. HARKNESS and W. A. TERRY, of Bristol, county of Hartford, and State of Connecticut, have invented certain new and useful Improvements in Broiling, Toasting, Meat, Bread, &c.; and we do hereby declare that the same is described and represented in the following specification and drawings; and to enable others skilled in the art to make and use our invention we will proceed to describe the construction, referring to the drawings, in which the same letters indicate like parts in each of the figures.

The nature of this improvement consists in constructing a rotating support to hold meat, bread, &c., operated by mechanical movements, so as to continually change or revolve the surface before the fire.

In the accompanying drawings Figure 1 shows an arrangement of gearing D or clock work inclosed in a case C so as to protect it from injury. The spindle A, projects through the case so as to secure the device B, which may be made of any form, or figure, to suit the fancy, and is supplied with pins c on which is placed the article desired to be broiled or toasted, which is set before the fire, and is kept in a continuous revolving motion, while the meat, bread, &c., is toasting, or broiling.

In broiling meat, the juice of the meat usually drips into the fire or drains away which is the nutritious part of the meat and which by this device, is preserved in the meat by its revolving motion, and keeping the meat moist and palatable.

The distinct or prominent feature of this improvement is the revolving support by mechanical movements, thereby securing the juice in the meat, and continually changing the surface to the heat or fire, thus producing or giving it a decided advantage over other modes of broiling, or toasting.

What we claim and desire to secure by Letters Patent is—

The above described broiling and toasting apparatus consisting of case C, clock movements D, arms B, spindle A, pins c arranged and operating substantially in the manner and for the purpose set forth.

H. W. HARKNESS.
WM. A. TERRY.

Witnesses:
JERMY. W. BLISS,
EDWARD W. BLISS.